United States Patent [19]

Mülhäuser

[11] 3,758,095

[45] Sept. 11, 1973

[54] DAMPED SPRING

[75] Inventor: Otto Mülhäuser, Berghausen, Germany

[73] Assignee: Gesellschaft fur Kernforschung mbH, Karlsruhe, Germany

[22] Filed: July 26, 1971

[21] Appl. No.: 165,952

[30] Foreign Application Priority Data
Aug. 18, 1970 Germany.................. P 20 40 915.8

[52] U.S. Cl. .............................................. 267/165
[51] Int. Cl............................................... F16f 1/32
[58] Field of Search................... 267/135, 162, 165

[56] References Cited
UNITED STATES PATENTS

| | | | |
|---|---|---|---|
| 3,002,740 | 10/1961 | Van Hulst............................ | 267/165 |
| 2,319,735 | 5/1943 | Hussman............................. | 267/135 |
| 2,559,903 | 7/1957 | Sjolander............................ | 267/135 |

*Primary Examiner*—James B. Marbert
*Attorney*—Spencer & Kaye

[57] ABSTRACT

A damping spring including a casing defining an interior space filled with a damping medium and individually stacked dished plates. The plates are subdivided into an even number of sectors and are supported along their edges. A slide valve cooperates with at least one aperture in the casing to vary the cross section thereof so as to allow variation of the damping characteristics of the spring.

12 Claims, 6 Drawing Figures

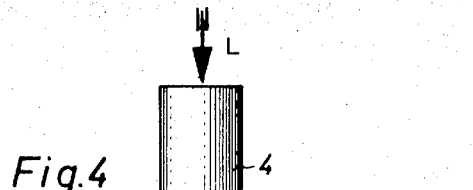
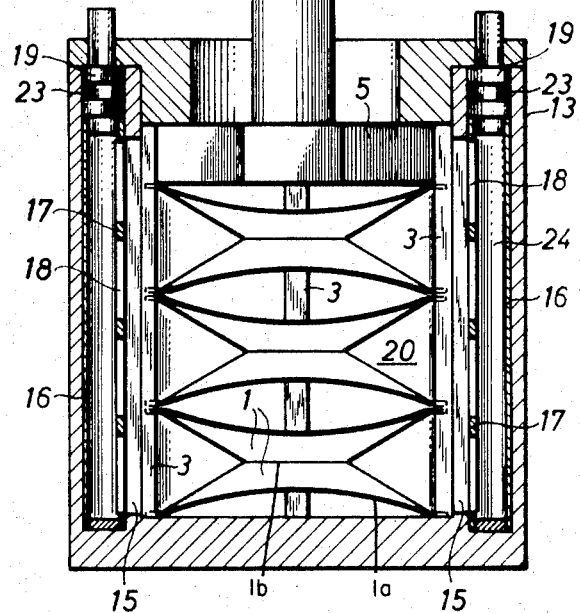
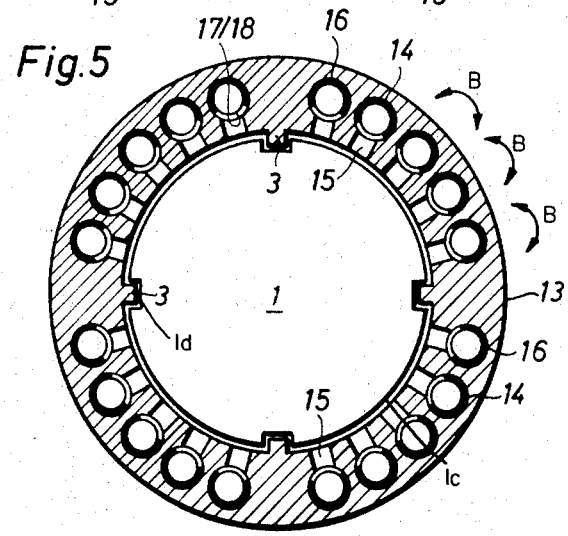

DAMPED SPRING

The present invention relates to a spring consisting of individual dished plates stacked on top of each other, which plates are supported relative to each other along their edges where they have guide parts corresponding to each other or to a holder and which are subdivided into even-numbered sectors with a dishing increasing from the center (saddle point) towards the edges, the direction of the dishing of adjacent sectors being opposed to each other.

It is the purpose of the present invention to make the damping of the spring variable and adjustable by means of simple design measures, setting and variation, respectively, of the damping being possible both in advance of the installation of the element and during operation.

In the present invention, this objection is fulfilled in that the plates are contained in the interior space of casing filled with a damping medium and that this interior space is connected with another space by at least one aperture whose cross section is made variable to allow the variation of the damping characteristics.

The additional space can consist of channels extending parallel to the flow cross sections between the wall of the disk plate and the wall of the casing. Covering of the apertures cross section by a suitable device, such as a slide valve, allows the flow resistance of these channels to be set arbitrarily with a corresponding influence on the damping of the set of springs.

The design and operation of the present invention is explained in more detail below on the basis of embodiments shown in FIGS. 1 to 6.

Figure 1:
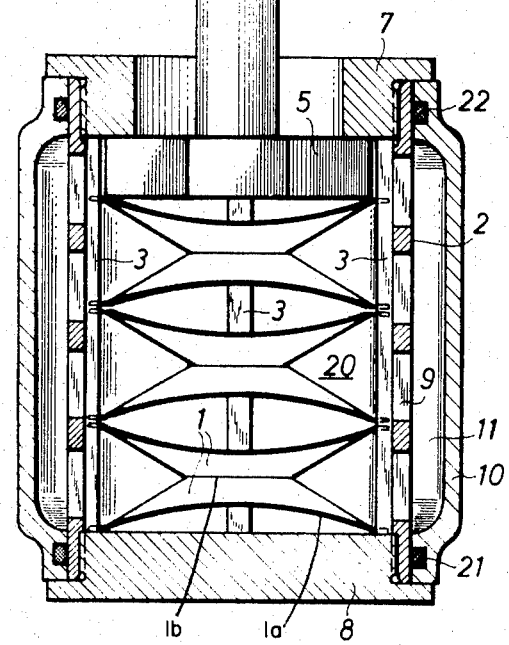
Figure 3:
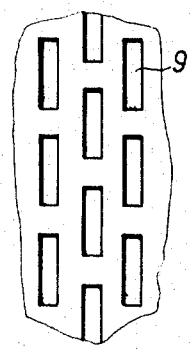
Figure 2:
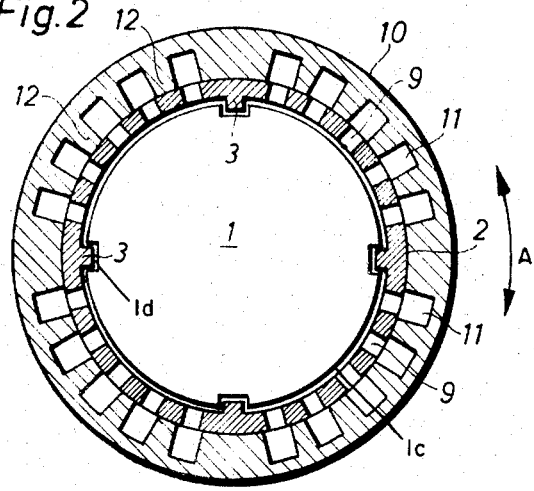

FIGS. 1 to 3 respectively show the cross section, plan view, and a detail of an embodiment of the present invention in which the channels are located in a joint rotary slide valve surrounding the spring casing.

FIGS. 4 to 6 respectively show a cross section, plan view, and detail of another embodiment of the present invention in which the channels are located in the spring casing proper and are controlled by individual slide valves.

In FIGS. 1 and 2, the spring plates 1 (and plates, respectively) are contained in a generally cylindrical casing 2. Each of the spring plates 1 have a generally concave surface 1a, a generally flat surface 1b and an edge 1c. The plates are arranged in pairs with the generally flat surfaces 1b of each pair of mating relationship with each other. The edges 1c of each spring plate 1 are provided with at least one slot 1d about their periphery. The casing 2 is equipped with as many protruding strips 3 as there are slots 1d in each plate 1. The strips 3 are received within the slots 1d and serve to fix the spring plates 1 relative to each other. A load L is exerted on the set of springs (totality of spring plates 1) by the piston 4 carrying a pressure plate 5 on its end facing the spring plates. The casing 2 is closed at the top and the bottom by covers 7 and 8 respectively, and equipped in the longitudinal direction parallel to the longitudinal axis of the casing 2 with, e.g., rectangular slots 9 whose arrangement is shown in a detail as a plan view of the outside of the casing in FIG. 3. These slots 9 are arranged in lines, the lines extending preferably in a direction parallel to the longitudinal axis of the casing 2. The shape of the slots 9 is of secondary importance in this connection. Instead of the designs shown in FIGS. 1-3 the slots 9 may also be circular bores arranged in lines.

The casing 2 is surrounded by a slide valve sleeve 10 containing longitudinal channels 11 which extend in the same direction as the direction of the slots 9. The channels 11 along with the interior 20 of the casing 2 define a damping volume in which the damping medium is contained. The slide valve sleeve 10 is is sealed at both ends by seals 21 and 22 as to be movable and tight against liquids. Between the channels 11 there are webs 12 whose width roughly corresponds to the width of the slots 9 in the casing. Rotation in the direction of the arrow A of the slide valve sleeve 1o covers the slots 9 by the webs 12 in a range from full open to full closed. The rotation of the sleeve 10 changes the passage cross sections between the internal space 2o of the casing 2 and the longitudinal channels 11 and thus causes the damping of the spring to change.

In the second embodiment shown in FIGS. 4-6 (for identical parts, the reference numbers have been taken from FIGS. 1-3), the spring 1 are contained in a casing 13 which, as described above, carries protruding guide strips 3. Again, the load L on the set of springs is exerted by the piston 4 and 5, respectively. In this case, for instance, twenty channels 14 extending in a direction parallel to the longitudinal axis of the casing 13 are incorporated in the casing 13 and are connected with the internal space 2o of the casing 13 by longitudinal slots 15.

The channels 14 contain tubular sleeve valves 16 with one longitudinal slot 18 each interrupted by transverse webs 17 on their one side. The rotary slide valves are provided at their one end (top near piston 5) with a plug 19 sealed in the casing 13 (seals 23) which protrudes from the casing.

Turning the individual sleeve valves 16 in the direction of the arrow B (shown on the drawing) will cover a corresponding slot 15 or aperture between the interior space 20 of the casing 13 and the longitudinal channel 18 in the sleeve valve 16, in a range from full open to full closed. The rotation of the valve 16 influences the passage cross section 17/18 between the two liquid spaces (both partial spaces 20,24), and thus has an influence also on the damping characteristic of the set of springs.

The individual sleeve valves 16 may be adjusted either individually or together. For the purpose of joint adjustment, the plugs 19 of the sleeve valves 16 protruding from the casing 13 can be equipped with suitable elements, e.g., gear wheels or levers driven by a joint gear wheel or a rotating ring.

The setting of both the slide valve sleeve 10 (FIG. 1) and the sleeve valves 16 (FIG. 4) can be fixed in a device prior to installation of the set of springs, or the two elements may be equipped with remote actuation devices which allow them to be adjusted during operation.

I claim:

1. A spring comprising in combination: a casing having at least one aperture therethrough and at least one protruding strip and defining an interior space filled with a damping medium; a plurality of individual stacked dished plates; means engaged with said casing and defining therewith at least one other space, said plurality of plates each having an edge with at least one slot therein, which engages said protruding strip, said plates supporting each other along their edges, said plates being subdivided into an even number of sectors with the dishing of each plate increasing from the center towards the edges thereof, the center constituting a saddle point, the direction of the dishing of adjacent sectors being opposed to each other, whereby the plates are contained in said interior space of said casing and said interior space is connected to said at least one other space through said at least one aperture; and means for varying the cross section of said at least one aperture to allow variation of the damping characteristics.

2. A spring as defined in claim 1, further comprising support means, wherein the wall of said casing includes a plurality of apertures which are arranged preferably on lines extending in the axial direction of said casing, and wherein the casing is enclosed by said means, said means including a slide valve sleeve which is supported by said support means so as to be displaceable, said slide valve sleeve having a plurality of open channels formed therein and opening through the inner wall of said sleeve, said channels extending in the same direction as the lines of apertures.

3. A spring as defined in claim 1, wherein said casing includes a plurality of channels incorporated in the wall thereof, said plurality of channels are connected with the interior space of said casing through a plurality of apertures and formed in said casing wall, said channels contain sleeve valves therein said sleeve valves include a partly interrupted longitudinal slot, said valves being rotatable in order to cover said apertures with the non-slotted portion of said valves and to provide a passage to the interior space of the casing when the slot and aperture are aligned.

4. A spring as defined in claim 2, wherein said slide valve sleeve is fixed in one position relative to said apertures.

5. A spring as defined in claim 3, wherein said sleeve valves are fixed either individually or jointly with respect to said apertures.

6. A spring as defined in claim 1, wherein its damping characteristics are continuously variable.

7. A spring as defined in claim 2, wherein said slide valve sleeve is actuated by remote control means.

8. A spring as defined in claim 3, wherein said sleeve valves are arranged to be selectively actuated individually or jointly by remote control means.

9. A damped spring comprising in combination:
a. a spring member having two opposite ends;
b. a first spring support engaging one end of said spring member;
c. a second spring support movable towards and away from said first spring support and engaging the other end of said spring member, said spring member opposing, by virtue of its resiliency, the relative movement between said spring supports in at least one direction;
d. means defining a first interior space and a passage, said means including a wall portion affixed to one of said spring supports, whereby said first interior space undergoes a volume variation upon a relative movement between said spring supports;
e. means defining a second interior space situated adjacent said first interior space and communicating therewith through said passage;
f. means operatively associated with said passage for varying the cross-sectional area thereof; and
g. a liquid filing said first interior space to dampen the movements of said spring supports relative to one another, a relative movement between said spring supports forcing said liquid from said first interior space through said passage into said second interior space, the magnitude of the dampening effect being a function of the cross-sectional area of said passage.

10. A damped spring as defined in claim 9, wherein said means defining said first interior space includes a casing enclosing said first interior space; said passage includes at least one throughgoing aperture provided in said casing; said means defining said second interior space includes a sleeve arranged about said casing and displaceable with respect thereto; said second interior space being bounded by said casing and said sleeve; said means for varying the cross-sectional area of said passage includes means defining an opening provided in said sleeve and communicating with said second interior space, said opening cooperating with said aperture in said casing; the extent of registry between said opening and said aperture being variable for altering said cross-sectional area by displacing said sleeve with respect to said casing.

11. A damped spring as defined in claim 9, wherein said means defining said first interior space includes a casing having a wall structure, said casing surrounding said first interior space; said passage includes at least one aperture provided in said casing and connecting said first and secnd interior spaces with one another; said means for varying the cross-sectional area of said passage includes a valve member movably received in said casing and having an opening cooperating with said aperture in said casing; the extent of registry between said opening in said valve member and said aperture in said casing being variable for altering said cross-sectional area by displacing said valve member with respect to said casing.

12. A damped spring as defined in claim 11, wherein said second interior space is contained entirely within the wall structure of said casing; said valve member has a tubular configuration and is fitted into said second interior space.

* * * * *

UNITED STATES PATENT OFFICE
CERTIFICATE OF CORRECTION

Patent No. 3,758,095                    Dated September 11th, 1973

Inventor(s) Otto Mühlhäuser

It is certified that error appears in the above-identified patent and that said Letters Patent are hereby corrected as shown below:

In the heading of the patent, line 2, change the inventor's last name to --Mühlhäuser--; line 4, change "fur" to --für--.
Column 1, line 17, change "objection" to --objective--;
line 18, after "of" insert --a--; line 26, change "apertures" to --aperture--; line 47, change "of mating" to --in mating--.
Column 2, line 19,
after "spring" insert --plates--; line 39, after "closed" change the comma "," to a period --.--. Column 3, line 17, change "havinga" to --having a--; line 25, delete "and".
Column 4, line 40, change "secnd" to --second--.

Signed and sealed this 19th day of March 1974.

(SEAL)
Attest:

EDWARD M. FLETCHER, JR.          C. MARSHALL DANN
Attesting Officer                Commissioner of Patents